United States Patent

[11] 3,544,721

[72] Inventor John Van Geen Sunnyvale, California
[21] Appl. No. 618,945
[22] Filed Feb. 27, 1967
[45] Patented Dec. 1, 1970
[73] Assignee Stanford Research Institute Menlo Park, California a corporation of California

[54] TELETYPE COMMUNICATION SYSTEM
5 Claims, 5 Drawing Figs.

[52] U.S. Cl. .......... 179/2, 178/4
[51] Int. Cl. .......... H04m 11/06
[50] Field of Search .......... 179/2, 2(C), 3, 4, 2(DP); 178/58, 58.1, 66, 66(A)

[56] References Cited

UNITED STATES PATENTS

| | | | |
|---|---|---|---|
| 2,345,953 | 4/1944 | Tolen | 178/58(.1) |
| 2,823,261 | 2/1958 | Zipf | 179/3 |
| 3,351,919 | 11/1967 | Milford | 179/2UX |
| 2,474,261 | 6/1949 | Liebe | 178/66(A) |
| 3,414,828 | 12/1968 | Westover | 178/66X |

*Primary Examiner*—Ralph D. Blakeslee
*Attorneys*—James Todorovic and Samuel Lindenberg

ABSTRACT: A teletype communication system is provided which converts teletype signals into signals shifted between two specified frequencies which represent characters being transmitted. These are transmitted over a telephone line. At the receiver, the received signals are converted into signals suitable for actuating a teleprinter. Acoustic coupling for transmission and reception is employed between the terminal apparatus and the telephone headsets. Provision is made to eliminate noise effects upon transmission and reception and carrier ripple effects upon reception.

PATENTED DEC 1 1970

3,544,721

INVENTOR.
JOHN VAN GEEN
BY Lindenberg & Freilich
ATTORNEYS

INVENTOR.
JOHN VAN GEEN
BY Lindenberg & Freilich
ATTORNEYS

TELETYPE COMMUNICATION SYSTEM

BACKGROUND OF THE INVENTION

1. Field of the Invention

This invention relates to the field of telegraphy and more particularly to a system for an improved teletypewriter communication system.

2. Description of the Prior Art

Teletypewriter communication systems which use the telephone lines for coupling between stations have been developed and are now in use. For coupling the teletypewriter signals to be transmitted to the telephone lines, either direct coupling or acoustic coupling is used and for removing these signals from the telephone lines, usually inductive coupling techniques are employed. It is known that the telephone company makes headsets having different types of receivers which generate magnetic fields having different orientations and/or different strengths. Accordingly, a coupling coil for a teletypewriter system which may be operative with one receiver will not be operative with another receiver, or may require a considerable amount of adjustment before a usable signal can be obtained.

other problems which have continued to plague these types of systems are noise signals between the teletypewriter and the frequency shift keyer which can cause erroneous frequency shift keying and ripple signals due to carrier signals on the telephone lines, which are not filterable and can operate to cause faulty operation of the teletypewriter at the receiver.

An object of this invention is the provision of teletypewriter terminal facilities which can couple to any type of telephone headset without requiring any physical contact or connection thereto.

Another object of the present invention is the provision of a teletypewriter terminal facility which substantially eliminates the effects of noise and ripple.

Still another object of the present invention is the provision of novel and improved teletypewriter terminal facilities.

SUMMARY

The foregoing and other objects of the invention are achieved by providing an acoustic coupling arrangement between the teletypewriter terminal facilities and the telephone receiver and transmitter. By way of example, a microphone is employed for picking up the output signals from the telephone transmitter and a loudspeaker is employed for driving a telephone receiver with frequency shift keying signals (FSK) generated by a teletypewriter terminal facility, in accordance with this invention. In order to minimize the effects of noise, which may occur between the teletypewriter and the frequency shift keyer used to control the FSK oscillator, provision is made to drive the frequency shift keyer by a bistable circuit which responds to the mark and space signals generated by the teletypewriter.

In order to minimize the effects of the ripple signals, after the signals received over the telephone line have been passed through a discriminator, they are used to drive a bistable circuit which does not respond to ripple frequency signals but does respond to the frequency shift signals.

Other features of a teletypewriter terminal in accordance with this invention, is the provision of an option for half duplex operation whereby a teleprinter at a transmitter terminal can transmit messages and print out said messages simultaneously. Also provided is a full duplex option whereby both teleprinter stations may act simultaneously as receivers and transmitters.

Also, circuitry is provided whereby the transmitting and receiving circuits in accordance with this invention are usable with other electronic industry data equipment which is designated as EIA standard equipment.

DESCRIPTION OF THE PREFERRED EMBODIMENTS

In order to facilitate both the description of this invention and an understanding thereof, the explanation which follows commences with the premise that signals representative of characters have been transmitted by a teleprinter terminal in accordance with this invention, in the form of frequency shift keyed signals, henceforth referred to as FSK signals. These signals have been applied to a telephone line acoustically in a manner which will be explained in connection with the transmitter of this system. A person who wishes to use a teleprinter terminal, in accordance with this invention, initiates a telephone call in the usual manner by dialing the telephone number of the receiving terminal. When the telephone is answered at the receiving terminal, he informs the party answering that a teleprinter message is to be transmitted, whereupon the party answering the telephone applies the telephone receiver to a microphone. Of course, if desired, automatic signaling techniques may be employed.

Figure 1:
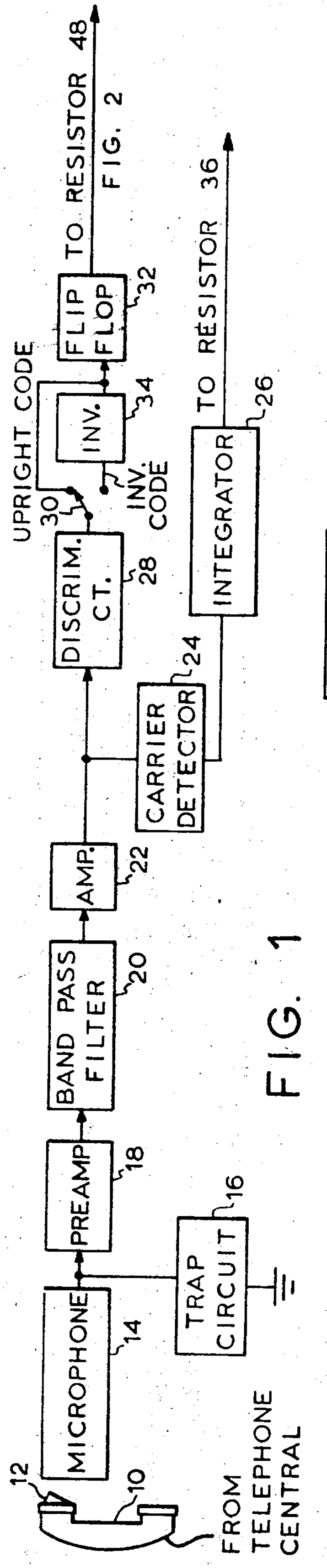
FIG. 1 is a block schematic diagram of part of the equipment required at a teleprinter terminal for receiving signals from the telephone line.

As shown in FIG. 1, a telephone 10 has its receiver portion 12 applied to the front face of a microphone 14, to cause the microphone to be actuated in response to the acoustical output of the telephone. A microphone having a good fidelity response is preferred however, the quality of the microphone response is not of too great significance.

The output of the microphone is applied to a trap circuit 16 which serves the function of shunting unwanted signal frequencies out of the signals which are applied to a preamplifier 18. In an embodiment of this invention which was built, the unwanted frequency signals centered on 1070 cycles per second, and these were removed by the trap circuit 16. The preamplifier serves the usual function of amplifying the microphone signal output. The output of the preamplifier is applied to a bandpass filter 20, which serves the usual function of passing only those signals which have frequencies within the desired band. By way of example, in an embodiment of the invention which was built, the passband of the bandpass filter ranged approximately from 2000 cycles to 2250 cycles.

The output of the bandpass filter is amplified by amplifier 22. The output of amplifier 22 should comprise signals having one or the other of two frequencies which are the well known FSK signals. These signals are applied to a carrier detector circuit 24 which is a well known circuit for providing an output signal when its input comprises signals of one or the other of the two FSK signal frequencies. The output of the carrier detector is applied to an integrator circuit 26. This is a circuit, which is well known, which charges up a capacitor in the presence of an input signal.

The output of the amplifier is also applied to the well known discriminator circuit which serves to pass only one or the other of the FSK signal frequencies. The output of the discriminator 28 may be connected through a switch 30 to directly drive a flip-flop circuit 32, when an "upright" code is desired. Alternatively, the output of the discriminator may be applied through the switch 30 to an inverter circuit 34, to drive the flip-flop circuit 32 with the output of the inverter circuit when an "inverted" code is used.

As is well known, the distinction between the upright code and the inverted code is that the mark and space signals in the upright code have respectively space and mark significance in the inverted code. The inverter circuit 34 inverts the received signals, as a result of which the flip-flop 32 is driven between its set and reset states in inverse manner to the way it is driven in response to signals directly received from the discriminator.

By using flip-flop 32, the effects of any ripple signal which may pass through the preceding circuitry is minimized, since the flip-flop has a dead zone or voltage hysteresis so that it cannot respond to ripple signals, but can only respond to signals having amplitude of mark and space signals which are produced at the output of the discriminator. Thus, the signals that are applied to the circuits which drive the teleprinter signal decoder are clean and correct binary signals.

Figure 2:
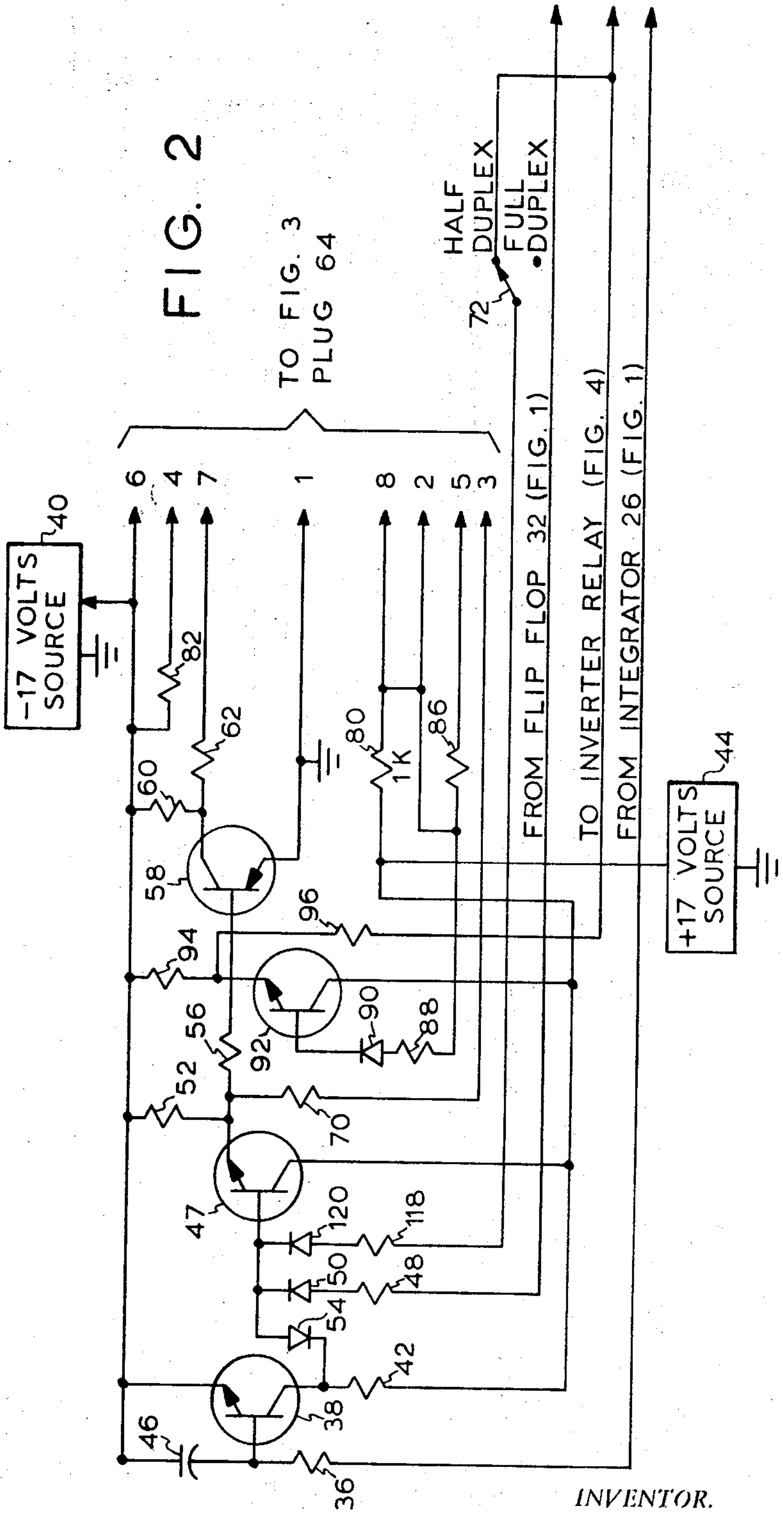
FIG. 2 is a circuit diagram of other equipment required for driving a teleprinter with the signals provided by an arrangement in accordance with FIG. 1.

FIG. 2 is a circuit diagram illustrating the usual mark-hold protective circuit, together with the full duplex, half duplex arrangement in accordance with this invention.

The output of the integrator circuit 26 in FIG. 1 is applied, through a resistor 36 in FIG. 2 to the base of a transistor 38. The emitter of the transistor 38 is connected to a source of potential 40, which is on the order of −17 volts. The collector of transistor 38 is connected through a load resistor 42 to a plus potential source 44 which may be on the order of +17 volts. A capacitor 46 is connected between the base and the emitter of the transistor 38 whereby a potential is applied to the base of the transistor 38 which can render it conductive in the absence of other signals. However, in the presence of a signal of sufficient amplitude applied from the integrator 26 (FIG. 1) to the base of the transistor, transistor 38 is rendered nonconductive. This signal occurs as long as either of the FSK signals are being received.

The output of flip-flop 32 is applied to the base of a transistor 47 through a resistor 48 connected in series with a diode 50. The emitter of the transistor 47 is connected through a resistor 52 to the negative potential source 40 and the collector of transistor 47 is connected to the positive potential source 44. The mark-hold circuit as represented by transistor 38 and its associated components operates so that, were there no carrier detected by the detector circuit 24 in FIG. 1, the transistor 38 would be conductive whereby a diode 54 which has its anode connected to the cathode of the diode 50 and its cathode connected to the collector of the transistor 38, could function to bypass any signals received from the flip-flop 32 through the diode 50 whereby the transistor 47 would only provide signals representative of "mark". The mark signal is represented by one output state of the flip-flop 32. The space signal is represented by the other output of the flip-flop 32, which is the one of the two outputs which is connected to the resistor 48. Thus, in the absence of any carrier being detected transistor 47 remains in the mark condition, and the teleprinter is not operated.

The output of transistor 47 is derived from its emitter. Its emitter is connected through a resistor 56 to the base of an amplifying transistor 58. The emitter of this transistor is connected to ground and the collector is connected to a load resistor 60 to the negative operating potential source. The collector is connected through a resistor 62 to pin 7 of a female plug 64, shown in FIG. 3, which is plugged into the male plug 66, which is connected to the teleprinter 68. The plug connections shown in FIG. 3 are the standard ones for receiving output from or applying input to a teleprinter.

Figure 3:
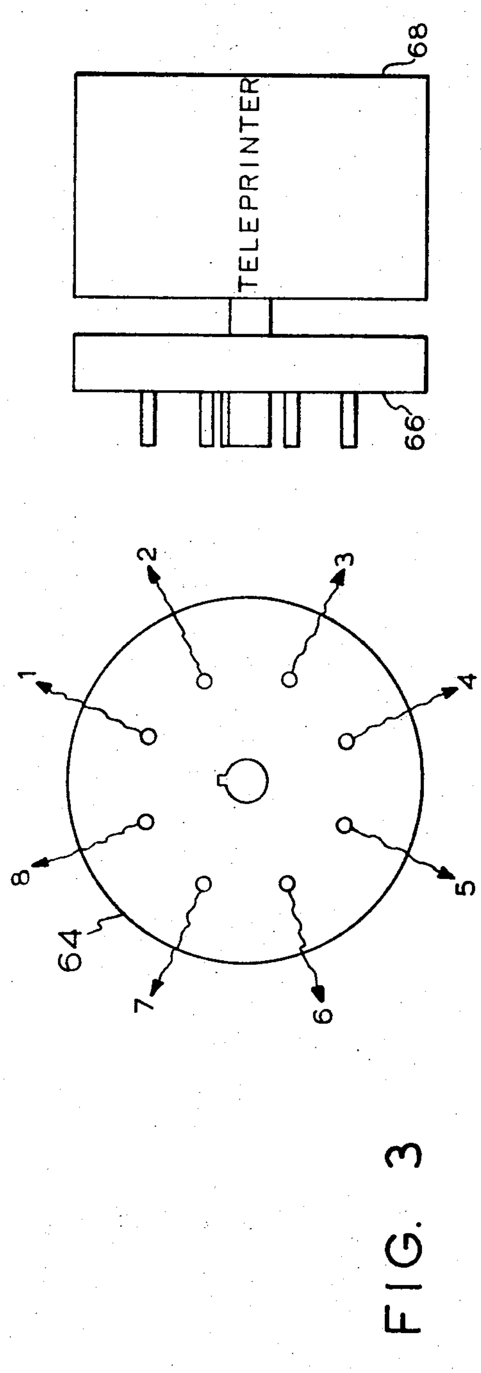
FIG. 3 is a schematic drawing of a teleprinter and its input-output plug which is shown for the purpose of providing an understanding of the operation of this invention.

The emitter output of transistor 47 is also connected through a resistor 70 to a pin 3 of the plug 64, shown in FIG. 3.

A switch 72, in FIG. 2, has two positions, providing two options, one of these is designated as the half duplex position, which is the position shown in the drawing, and the other is a full duplex position as previously explained herein. The half duplex option is the conventional one wherein a teleprinter at one location transmits signals to the teleprinter at the receiving location, and simultaneously types the message being transmitted. The teleprinter at the receiving location, after all signals have been received can then transmit back to the original transmitting location. The full duplex option is one wherein the teleprinter terminals can both receive and transmit signals simultaneously.

Referring now to FIG. 3, terminals, 1, 2 and 3 of the female plug 64 are the ones which are used for EIA standard data equipment. Terminals 4 and 5 are the ones to which the output signals of the teleprinter 68 are applied, which occur upon the actuation of any of the keys of the teleprinter. Terminals 6 and 7 are the ones to which the input signals received over the telephone lines are applied, for actuating the printing units of the teleprinter for printing out the message received. Terminal 7 is connected by a lead directly to terminal 5, when it is desired to use the system with a teleprinter. When it is desired to use EIA standard equipment the lead connecting terminals 8 and 5 is removed, thus allowing pin 2 to be independently driven. Terminal 8 is connected through a resistor 80, shown in FIG. 2 to the +17 volt potential source.

The two terminals 4 and 5 in FIG. 3, which provide the mark and space output signals representative of the key which has been actuated on the teleprinter, are connected to the circuit shown in FIG. 3. Terminal 4 is connected through a resistor 82 to the negative potential source 40. Terminal 5 is connected through a resistor 86 back to pin 2 on plug 64 and also through a resistor 88 connected in series with a diode 90, to the base of a transistor 92. Transistor 92 has its emitter 94 connected to the negative potential source 40. Its collector is connected to the positive potential source 44. The emitter of transistor 92 is connected through a resistor 96 to an inverter relay 98, which is shown in FIG. 4.

Figure 4:
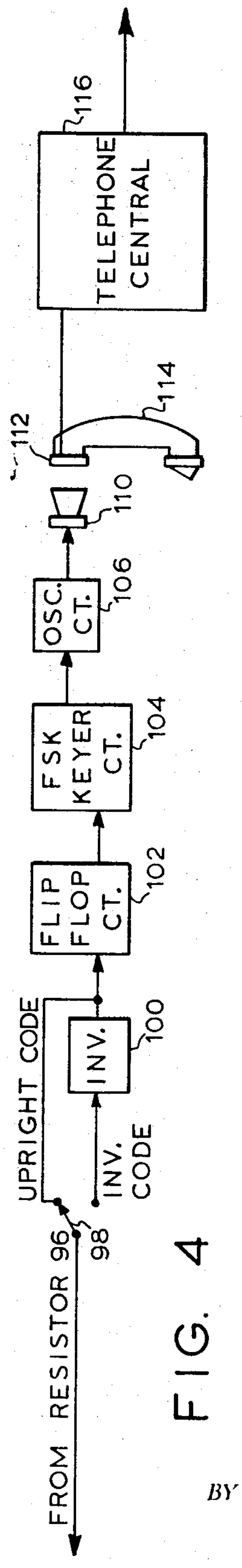
FIG. 4 is a block schematic diagram of the transmitting portion of a teleprinter terminal in accordance with this invention.

The inverter relay 98 in the position shown in FIG. 4, will enable the transmission of the mark-space signal in the upright code. In the other position, the signals are inverted by means of the inverter 100.

The output received directly from the teleprinter or the output received from the inverter 100 is applied to drive the flip-flop 102. The space signal drives the flip-flop to a set state from which it is returned to a reset state by the mark signal. The set output of the flip-flop is applied to drive a frequency shift keyer circuit 104. This frequency shift keyer circuit is well known circuitry, which is used to drive an oscillator 106 to provide as an output one or the other of two oscillation frequencies as determined by the mark and space inputs to the flip-flop 102. By way of illustration, and not to serve as a limitation upon the invention, two frequencies which were employed as the respective mark and space representative signals were 1270 cycles per second and 1070 cycles per second.

The flip-flop circuit 104 is another important feature of this invention, since it ensures that the frequency shift keyer is driven in response to only the mark and space signals which are provided by the teleprinter and not by any noise signals. By reason of the flip-flop circuit required amplitude driving level, the effects of noise at the transmitter, which are generated by the teleprinter and the intervening circuits to the FSK driver are substantially eliminated.

The output of the oscillator circuit 106 is applied to a loudspeaker 110. The transmitter 112 of the usual telephone headset 114 is placed adjacent the loudspeaker to be driven thereby. A telephone headset 114 is connected to the usual telephone central 116, and sends out the signals that it receives to the telephone central.

The teleprinter generates mark and space signals and, these are applied via pins 4 and 5 and specifically over pin 5 (the teleprinter signals comprising code pulse trains of signals wherein each pulse has an amplitude on the order of minus 17 volts). These signals, as may be seen in FIG. 2 are applied through resistors 86, 88 and diode 90 to the base of transistor 92. Output is taken from the emitter of this transistor, and through resistor 96 is applied to the inverter relay 98 in FIG. 2 and also via switch 72, when in its half duplex position, to a resistor 118 which is connected in series with a diode 120. The diode in turn is connected to the base of transistor 47. It should be recalled that the transistor 47 is used to apply incoming mark-space teleprinter code signals to the local teleprinter. Therefore, in the half duplex mode, the signals which are produced by the local teleprinter are both transmitted and are returned to drive the local teleprinter to produce an indication of the data which is being transmitted using the teleprinter.

When the switch 72 is operated to its full duplex position, then, the output of transistor 92 is not fed back to drive the local teleprinter. Accordingly, the teleprinter is free to respond to incoming messages while transmitting messages to a distant terminal.

Figure 5:
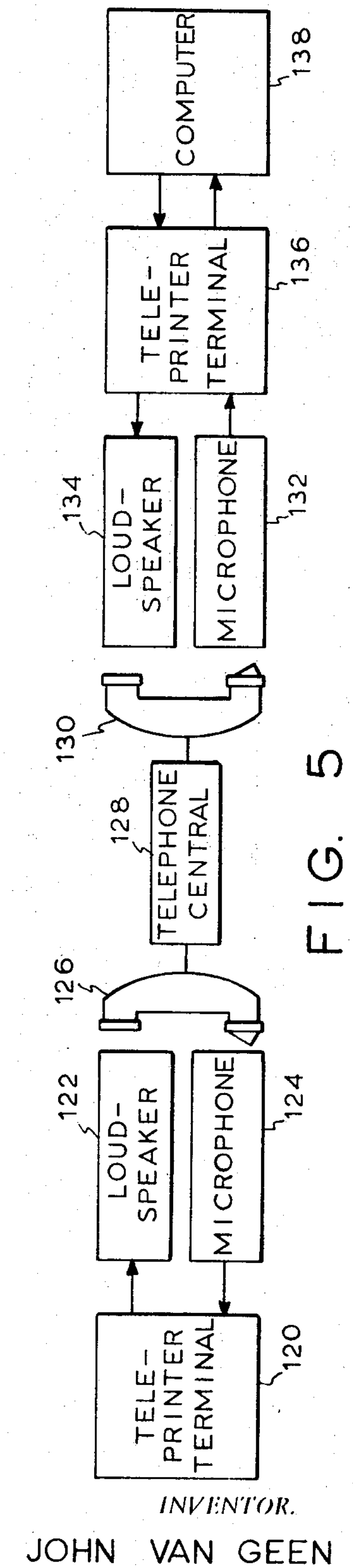
FIG. 5 is a block diagram illustrating an important utilization of the present invention.

FIG. 5 illustrates in block diagram form a significant application of this invention. A teleprinter terminal, 120, of the type described has an output loudspeaker 122 and an input microphone 124. These are acoustically coupled to a telephone headset 126. The headset 126 is connected, in well known fashion, through telephone central, 128, to another headset 130. The telephone headset 130 is acoustically coupled, via a receiving microphone 132, and transmitting loudspeaker 134, to the teleprinter terminal 136. The teleprinter terminal 136 can be used to address or as a data input device for a a computer 138. The teleprinter terminal 136 can also serve as an output device for the computer, and the information received from the computer can be then sent back to the teleprinter terminal 120. Thus, there is provided a means for acoustically communicating with an receiving data from a computer through the telephone lines, by means of this invention.

There has accordingly been described and shown herein a novel and useful teleprinter terminal arrangement which, by the use of acoustic coupling techniques avoids the problems of coupling to different types of telephone headset arrangements. Also, the system, in accordance with this invention, provides a circuit arrangement whereby the effects of locally generated noise on transmission are substantially eliminated as well as the effects of carrier ripple which can cause errors in the receiving equipment.

By virtue of the "all acoustic" coupling of a teleprinter terminal to a telephone headset, afforded by the present invention, teleprinter terminals may be made portable to enable ready communication, from any telephone location to any other telephone location. There is afforded, by this invention, a means of communication from a portable teleprinter terminal to a centrally located teleprinter terminal which can include a computer facility for which the teleprinter serves as an input-output device. As a result, inquiries may be addressed to a computer from any telephone location, no matter how remote, and the answer thereto is received and typed out at the portable teleprinter terminal.

I claim:

1. A teleprinter terminal having a teleprinter for generating mark-space teleprinter signals desired to be transmitted and for responding to received mark-space teleprinter signals, said terminal including a single flip-flop to which all of said mark-space teleprinter signals to be transmitted are applied for generating at its output a serial train of binary signals representative of said mark-space signals;

a frequency shift oscillator means to which the output of said single flip-flop is applied for generating frequency shift oscillations responsive thereto; and acoustic transducer means for converting the output of said frequency shift oscillator means to acoustical signals suitable for application to a telephone headset for transmission over a telephone circuit.

2. A teleprinter terminal as recited in claim 1 wherein there is included means for receiving the frequency shift oscillations which are transmitted over the telephone line, a single flip-flop for converting said received signals to a serial train of binary signals, and teleprinter means for utilizing said binary signals.

3. In a teleprinter terminal of the type wherein teleprinter signals are applied to the transmitter of a telephone headset for transmission over telephone lines, and the transmitted signals are received from the receiver of a telephone headset and are thereafter applied to the teleprinter means, the improvement comprising:

first transistor means for applying signals generated by said teleprinter means to said telephone headset transmitter;

second transistor means for applying signals from said telephone headset microphone to said teleprinter means;

switch means having an open and a closed position, for respectively providing a full and half duplex option; and means connecting the switch means when in its closed position between the output of said first transistor means and the input to said second transistor means.

4. Apparatus as recited in claim 3 wherein there is included in said means for coupling the signals from said telephone headset microphone to said teleprinter means; microphone means for acoustically coupling to said telephone headset microphone; flip-flop means having its output connected to said second transistor means; inverter means having an input and an output connected to said flip-flop means input; and switch means having a first position for connecting said microphone means output to said flip-flop means input and a second position for connecting said microphone means output to said inverter means input for respectively providing upright and inverted code options.

5. Apparatus as recited in claim 4 wherein said means for applying the output of said first transistor means to said telephone headset transmitter includes flip-flop means having an input and an output; inverter means having an input and an output connected to said flip-flop means input; switch means having a first position for connecting said first transistor means output to said flip-flop means input and a second position for connecting said first transistor means output to said inverter means input for respectively providing an upright and inverted code option; frequency shift keying oscillator means; means for driving said frequency shift keying oscillator means with said flip-flop means output; and loudspeaker means to which said frequency shift keying oscillator means is applied for acoustically applying signals to said telephone transmitter.